United States Patent
Johanson et al.

(10) Patent No.: US 12,489,286 B2
(45) Date of Patent: Dec. 2, 2025

(54) POWER CABLE WITH A CABLE JOINT WATER BARRIER MADE OF TIN OR TIN ALLOY

(71) Applicant: NEXANS, Courbevoie (FR)

(72) Inventors: Audun Johanson, Oslo (NO); Sigurd Schawlann, Son (NO); Massimiliano Mauri, Borgenhaugen (NO); Simon Jorgensen, Sellebakk (NO)

(73) Assignee: NEXANS, Courbevoie (FR)

( * ) Notice: Subject to any disclaimer, the term of this patent is extended or adjusted under 35 U.S.C. 154(b) by 79 days.

(21) Appl. No.: 18/132,702

(22) Filed: Apr. 10, 2023

(65) Prior Publication Data
US 2023/0378740 A1    Nov. 23, 2023

(30) Foreign Application Priority Data
Apr. 12, 2022  (EP) .................................... 22305524

(51) Int. Cl.
*H02G 15/00*  (2006.01)
*H02G 1/14*  (2006.01)
*H02G 15/18*  (2006.01)

(52) U.S. Cl.
CPC .............. *H02G 15/18* (2013.01); *H02G 1/14* (2013.01)

(58) Field of Classification Search
CPC ................................. H02G 15/18; H02G 1/14
See application file for complete search history.

(56) References Cited

U.S. PATENT DOCUMENTS

| | | | |
|---|---|---|---|
| 4,016,356 A | | 4/1977 | Mcloughlin |
| 4,518,819 A | * | 5/1985 | Larsson ................. H02G 15/10 29/857 |
| 9,425,605 B2 | * | 8/2016 | Yaworski ........... H02G 15/1833 |
| 11,201,458 B2 | * | 12/2021 | Ekholm ............... H02G 15/117 |
| 2022/0115165 A1 | | 4/2022 | Johanson et al. |

FOREIGN PATENT DOCUMENTS

| | | |
|---|---|---|
| DE | 27 45 579 | 4/1979 |

OTHER PUBLICATIONS

European Search Report dated Sep. 26, 2022.

* cited by examiner

*Primary Examiner* — Pete T Lee
(74) *Attorney, Agent, or Firm* — CANTOR COLBURN LLP

(57) ABSTRACT

Power cables are provided having a joint with a metallic water barrier and, in particular, metallic water barrier materials for cable joints for use in high voltage cables for both land and submarine applications.

17 Claims, 4 Drawing Sheets

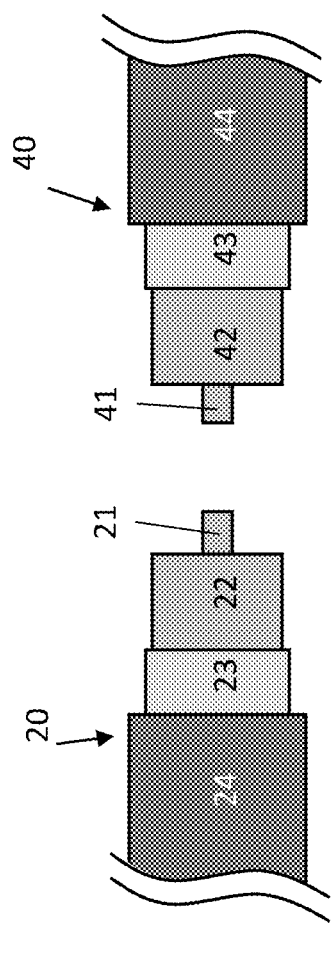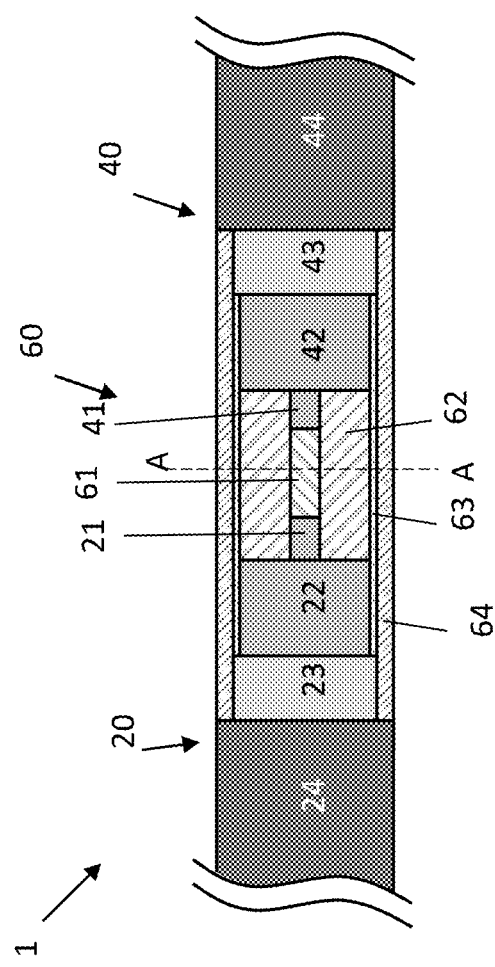
Fig. 1
Fig. 2

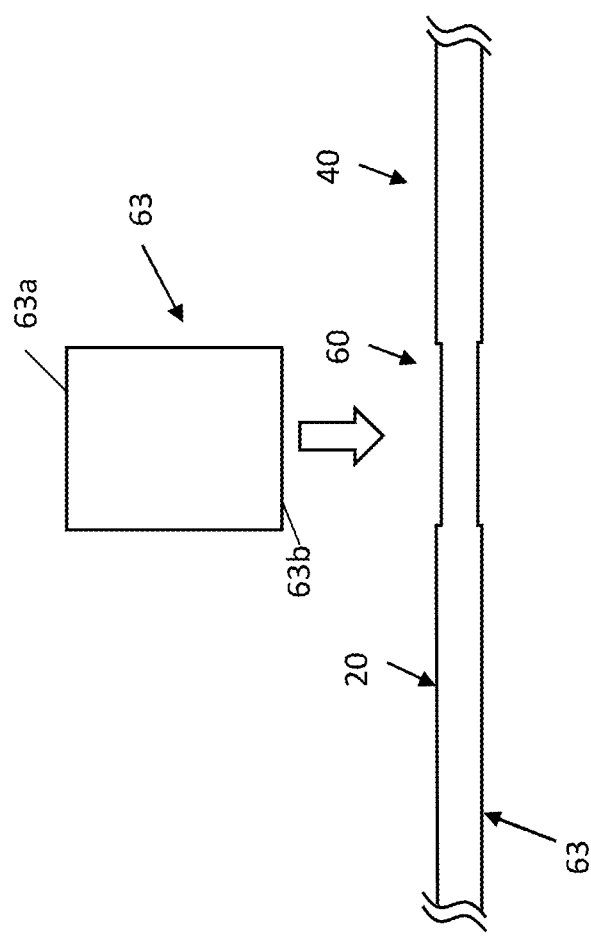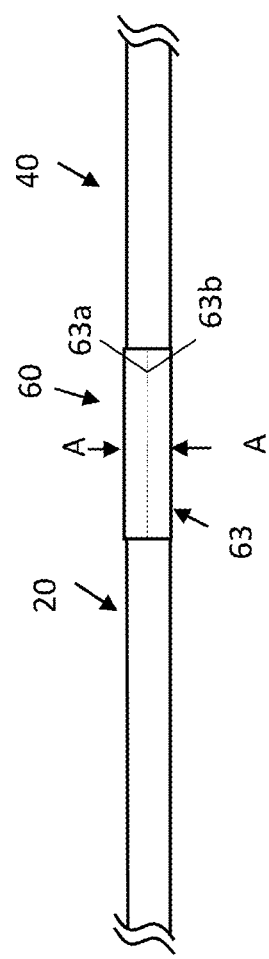

POWER CABLE WITH A CABLE JOINT WATER BARRIER MADE OF TIN OR TIN ALLOY

RELATED APPLICATION

This application claims the benefit of priority from European Patent Application No. 22 305 524.5, filed on Apr. 12, 2023, the entirety of which is incorporated by reference.

FIELD OF THE INVENTION

The present invention relates to power cables comprising a joint with a metallic water barrier and in particular, metallic water barrier materials for cable joints for use in high voltage cables for both land and submarine applications.

BACKGROUND

Power cables for intermediate to high voltage ratings typically comprise an inner conductor and several layers provided radially outside the inner conductor, such as an electric insulation layer, a semiconductive shielding layer, an armouring layer and an outer sheathing.

Power cables commonly comprise a sheath layer consisting of lead to be used as a radial water barrier. This relates to submarine power cables but is also relevant for other cables subjected to potential humid environment. Water and humidity are detrimental to electrical insulating materials for all power cables conducting electricity at medium and high voltages.

Conventional cables often use extruded lead as radial water barrier. Lead is a metal applicable as radial water barrier because of its relatively low melting point, the metal is soft and has a high malleability. However, its toxicity and negative environmental effects encourage the industry to find alternative solutions.

It is, due to a number of reasons, sometimes necessary or economical to manufacture one long cable comprising cable sections joined to each other by means of a joint. The joint should obtain at least similar mechanical and electrical properties as compared to the rest of the cable to avoid the joint to become a weak link in the power cable. The joint should not have a considerably larger outer diameter than the outer diameter of the cable sections themselves.

The joint must have a water barrier layer joining the water barrier layer of the two cable sections.

In one aspect the same material is used for the water barrier layer of the joint and the water barrier layers of the two joining cable sections.

In another aspect the material of the water barrier may be different from the water barrier material of the two joining cable sections.

In another aspect the joint may join cable sections with different water barrier materials.

In another aspect the joint may join cable sections with the same water barrier materials.

As mentioned above lead is not desired due to environmental issues. Hence, one object of the present invention is to provide a power cable water barrier sheath for cable joints wherein the water barrier sheath of the cable joint is made of tin or a tin alloy.

SUMMARY OF THE INVENTION

The present inventors have solved the above-mentioned need by providing in a first aspect a power cable assembly comprising:

a first power cable section having a first conductor, a first electrically insulating layer outside the first conductor and a first water barrier provided radially outside the first electrically insulating layer;

a second power cable section having a second conductor, a second electrically insulating layer outside the second conductor and a second water barrier provided radially outside of the second electrically insulating layer;

a cable joint at which location the first conductor is electrically connected to the second conductor, wherein the cable joint comprises a joint insulating layer for joining the first electrically insulating layer and the second electrically insulating layer and a joint water barrier for joining the first water barrier and the second water barrier;

characterized in that
the joint water barrier is made of tin or a tin alloy.

In one embodiment of the first aspect the first water barrier and/or the second water barrier is/are a welded metal sheath or an extruded metal sheath or a laminate structure comprising a metal foil between to polymeric layers and wherein the metal is selected from either an Al/Al-alloy, a Cu/Cu-alloy, a Sn/Sn-alloy, a Ti/Ti-alloy or a Fe/Fe-alloy, a copper alloy such as CuNi, CuNiSi, CuZn, CuSn, CuAl, or a Fe-alloy such as 316 steel.

In one embodiment of the first aspect the joint water barrier is made of commercially pure Sn, Sn—Cu or Sn—Sb.

In one embodiment of the first aspect the joint water barrier is made of:

commercially pure Sn material that has a Sn content of at least 99.5% by weight and a content of unavoidable impurities from 0 to 0.5% by weight based on the total weight of the pure Sn material, and wherein the content of Sn and unavoidable impurities sum up to 100% by weight;

a Sn alloy that has a Sn content from 97%-99.5% by weight, a Cu content from 0.5% to 2% by weight and a content of unavoidable impurities of 0 to 1% by weight based on the total weight of the Sn alloy, and wherein the content of Sn, Cu and unavoidable impurities sum up to 100% by weight; or a Sn alloy that has a Sn content from 93%-96% by weight, a Sb content from 4% to 6% by weight and a content of unavoidable impurities of 0 to 1% by weight based on the total weight of the Sn alloy, and wherein the content of Sn, Cu and unavoidable impurities sum up to 100% by weight.

In one embodiment of the first aspect the joint water barrier is partially overlapping the first water barrier and/or the second water barrier.

In one embodiment of the first aspect the joint water barrier is joined to the first water barrier and to the second water barrier by welding, soldering or by an adhesive. Thereby a first attachment between the first water barrier and the joint water barrier is formed together with a second attachment between the second water barrier and the joint water barrier.

In one embodiment of the first aspect the power cable assembly further comprises a first reinforcement located radially around and attached to at least a part of the joint water barrier adjacent to the first attachment, the first attachment, and further to a part of a first outer sheathing of the first power cable section and/or a second reinforcement located radially around and attached to at least a part of the joint water barrier adjacent to the second attachment, the second attachment and further to a part of a second outer sheathing of the second power cable section.

In one embodiment of the first aspect the first reinforcement and the second reinforcement comprise a polyethylene-based adhesive.

In one embodiment of the first aspect the joint water barrier is shaped as a sleeve.

In one embodiment of the first aspect the power cable is a subsea power cable.

In one embodiment of the first aspect the power cable is a land power cable.

In one embodiment of the first aspect the power cable is a high voltage power cable.

In a second aspect there is provided a method for joining a first water barrier layer of a first cable section and a second water barrier layer of a second cable section at a location of a joint, wherein the method comprises the steps of:
- a) providing a sleeve-shaped joint water barrier made of tin or a tin alloy;
  - moving the sleeve-shaped joint water barrier radially outside, and along, the first cable section and/or the second cable section to the location of the joint;
- b) radially compressing the sleeve-shaped joint water barrier at the location of the joint;
- c) joining a first end of the joint water barrier to the first water barrier of the first cable section wherein the first end of the joint water barrier is partially overlapping the first water barrier,
- d) joining a second end of the joint water barrier to the second water barrier of the second cable section wherein the second end of the joint water barrier is partially overlapping the second water barrier.

In one embodiment of the second aspect the step of radially compressing the sleeve-shaped joint water barrier at the location of the joint comprises:
rolling, hydrostatic forming or hydraulic forming.

In one embodiment of the second aspect the steps of joining a first end of the joint water barrier to a first water barrier of the first cable section and joining a second end of the joint water barrier to a second water barrier of the second cable section are by welding, soldering or by an adhesive.

In a third aspect there is provided another method for joining a first water barrier layer of a first cable section and a second water barrier layer of a second cable section at a location of a joint, wherein the method comprises the steps of:
- a) providing a joint water barrier in form of a sheet made of tin or a tin alloy;
  - folding the joint water barrier sheet having a first side edge and a second side edge opposite of the first side edge radially around the joint, thereby providing the first side and the second side adjacent to each other;
- b) forming a joint water barrier sheath by longitudinally friction stir welding the first side edge and the second side edge;
- c) joining a first end of the joint water barrier to the first water barrier of the first cable section;
- d) joining a second end of the joint water barrier to the second water barrier of the second cable section.

In one embodiment of the third aspect the steps of joining a first end of the joint water barrier to a first water barrier of the first cable section and joining a second end of the joint water barrier to a second water barrier of the second cable section are formed by soldering or orbital friction stir welding. The methods of the second and the first aspects are suitable for preparing the power cable of the first aspects.

In one embodiment of the second or third aspect step c) further comprises forming a first reinforcement by
  attaching the first end of the joint water barrier to the first water barrier by forming a first attachment, and
  arranging a polyethylene based adhesive layer laid radially around and covering at least a part of the joint water barrier adjacent to the first attachment, the first attachment and further a part of an outer sheathing of the first power cable section, and
wherein step d) further comprises forming a second reinforcement by
  attaching the second end of the joint water barrier to the second water barrier by forming a second attachment, and
  arranging a polyethylene based adhesive layer laid radially around and covering at least a part of the joint water barrier adjacent to the second attachment, the second attachment and further a part of an outer sheathing of the second power cable section.

In one embodiment of the second or third aspect a further thermoplastic layer is laid radially around and covering at least the first reinforcement and the second reinforcement and heat treating the polyethylene based adhesive layer of the first reinforcement and the second reinforcement and the thermoplastic layer at a temperature thermally setting and melting together the adhesive layer and the thermoplastic layer.

In one embodiment of the second or third aspect the first water barrier of the first cable section and/or the second water barrier of the second cable section is/are a welded metal sheath, an extruded metal sheath or a laminate structure comprising a metal foil between two polymeric layers and wherein the metal is selected from either an Al/Al-alloy, a Cu/Cu-alloy, a Sn/Sn-alloy, a Ti/Ti-alloy or a Fe/Fe-alloy, a copper alloy such as CuNi, CuNiSi, CuZn, CuSn, CuAl, or a Fe-alloy such as 316 steel.

In a fourth aspect, there is provided a joint water barrier for forming a water barrier of a joint joining a first cable section and a second cable section wherein the joint water barrier is sleeve-shaped and wherein the joint water barrier is made of a commercially pure Sn material or is made of Sn-alloy material.

BRIEF DESCRIPTION OF DRAWINGS

FIG. 1 illustrates a side view of an end of a first cable section and an end of a second cable section, wherein the respective ends are prepared for being joined to each other.

FIG. 2 illustrates a side view of the first cable section and the second cable section of FIG. 1 being joined by means of a joint, the joint being illustrated by its cross section in the cable direction.

FIG. 4c illustrates a joint water barrier 63 sheet that is folded radially around the joint 60.

FIG. 4d illustrates a joint water barrier 63 sheath that is formed by longitudinally friction stir welding of the ends of the water barrier sheet according to the method of the third aspect.

Figure 3:
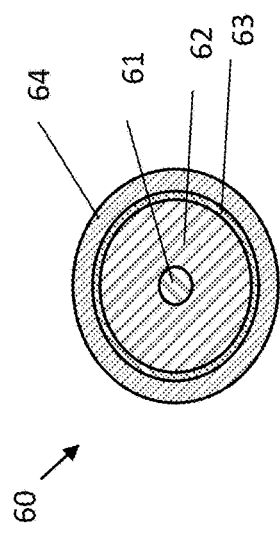
FIG. 3 illustrates a cross sectional view of the joint along line A-A of FIG. 4b.
Figure 4A:
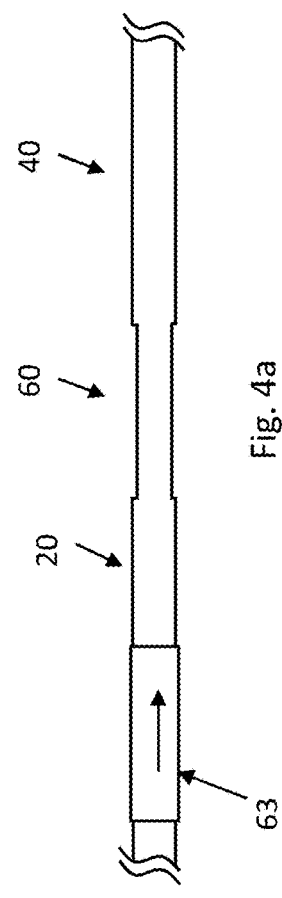
FIG. 4a illustrates how the sleeve-shaped joint water barrier is moved along a cable section towards the location of a joint.
Figure 4B:
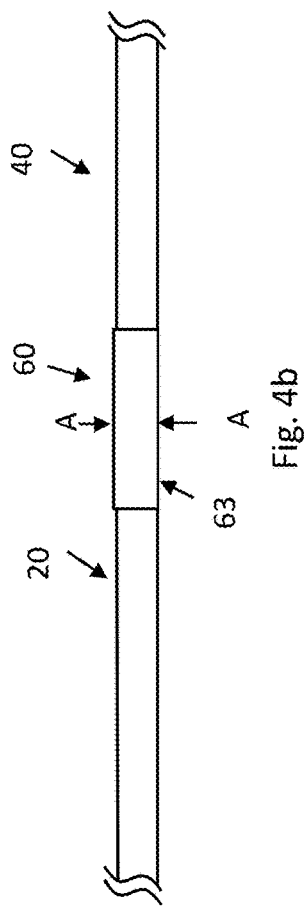
FIG. 4b illustrates the sleeve-shaped joint water barrier moved to the location of the 20 joint.

The drawings are sketches of the cables and do not comprise all the details of the cable assembly.

DETAILED DESCRIPTION

In the following description, various examples and embodiments of the invention are set forth in order to provide the skilled person with a more thorough understanding of the invention. The specific details described in the context of the various embodiments and with reference to the attached drawings are not intended to be construed as limitations.

Where a numerical limit or range is stated herein, the endpoints are included. Also, all values and sub ranges within a numerical limit or range are specifically included as if explicitly written out.

As mentioned above, the present invention provides a power cable comprising a cable joint with a water barrier layer wherein the water barrier layer of the cable joint is made of tin or a tin alloy.

Definitions:

Percentage solution may refer to: Mass fraction (chemistry) (or "% w/w" or "wt. %."), for percent mass.

The term "high voltage" as applied herein refers to a voltage above 36 kV such as in the range 50 kV to 800 kV.

Water Barrier Layer for Cable Joints Made of Tin or a Tin Alloy

Similar to lead, tin is a soft, malleable and highly ductile metal with a relatively low melting temperature of around 232° C.

It is well known that tin and its alloys can have different crystal structures, wherein the alpha-tin crystal structure has a face-centred diamond-cubic structure and beta-tin has a body-centred tetragonal crystal structure. In cold conditions beta-tin can transform spontaneously into alpha-tin, a phenomenon known as "tin pest" or "tin disease". Commercially pure grades of tin with a tin content of at least 99.5% resist transformation because of the inhibitory effect of small amounts of bismuth, antimony, lead and silver present as unavoidable impurities. Alloying elements such as copper (Cu) and antimony (Sb) also increase the hardness of tin (Sn). Thus, the tin and tin-alloys for use as a metallic water barrier over a joint are selected from commercially pure tin, a Sn—Cu alloy or a Sn—Sb alloy. Table 1 and 2 below depict further details and embodiments of the water barrier material.

TABLE 1

| Commercially pure tin | |
| --- | --- |
| Sn [wt %] | >=99.5 |
| Unavoidable impurities [wt %] | 0-0.5 |

TABLE 2

| | Alloy 1 | Alloy 2 |
| --- | --- | --- |
| Sn [wt %] | 97-99.5 | 93-96 |
| Cu [wt %] | 0.5-2 | |
| Sb [wt %] | | 4-6 |
| Unavoidable impurities [wt %] | 0-1 | 0-1 |

It is noted that any percentage amount of a metal component in an alloy described herein is provided as a fraction of the weight of the metal per total weight of the alloy as a percentage, or [wt %].

It will be appreciated by a skilled person that, where a range of a percentage amount of a metal in an alloy is given, the amount of metal in that alloy may vary within that range, provided the total amount of all metals in that alloy adds up to a total of 100 wt %. It will also be appreciated that some metals and alloys may inevitably have very small quantities of impurities within them. These unavoidable impurities may be present since they are typically either too difficult or costly to remove when the metal or alloy is being produced. These impurities may be present in the range from 0.0001%, 0.001%, 0.005% or 0.01% to 0.1%, 0.5%, 1% (wt) based on the total weight of the alloy and wherein each impurity does not exceed 0.5% by weight based on the total weight of the alloy. It will be appreciated such impurities may be present in the metals and alloys of the present invention without affecting or departing from the scope of the invention and comprises the following substances bismuth, antimony, lead and silver.

The water barrier layer for a cable joint may be commercially pure Sn.

The water barrier layer for a cable joint may be a Sn-0.7Cu alloy.

The water barrier layer for a cable joint may be a Sn-5Sb alloy.

Power Cable Comprising a Cable Joint

The invention is described further with reference to the FIGS. 1 to 5 of the drawings, which show different views and embodiments of the cable comprising a cable joint.

In a first aspect there is provided a high voltage power cable assembly 1 comprising:

a first power cable section 20, 120 having a first conductor 21, 121, a first electrically insulating layer 22, 122 outside the first conductor 21, 121 and a first water barrier 23, 123 provided radially outside the first electrically insulating layer 22, 122;

a second power cable section 40, 140 having a second conductor 41, 141, a second electrically insulating layer 42, 142 outside the second conductor 41, 141 and a second water barrier 43, 143 provided radially outside the second electrically insulating layer 42, 142;

a cable joint 60, 160 at which location the first conductor 21, 121 is electrically connected to the second conductor 41, wherein the cable joint 60, 160 comprises a joint insulating layer 62, 162 for joining the first electrically insulating layer 22, 122 and the second electrically insulating layer 42, 142 and a joint water barrier 63, 163 for joining the first water barrier 23, 123 and the second water barrier 43, 143; wherein the joint water barrier 63, 163 is made of tin or a tin alloy.

Further details of the water barrier material of the cable joint are described above under section "water barrier layer for cable joints made of tin or a tin alloy".

The water barriers of the first 23, 123 and the second 43, 143 water barriers may be similar or dissimilar. For example, one of the first and second water barriers may be an extruded lead sheath or extruded Sn/Sn-alloy sheath typically applied in static cables or it may be of any other metal known to the skilled person to be suited for forming water barriers in power cables. The first water barrier may also, in example embodiments, be of the same metal as the second water barrier which is a water barrier made of a welded metal sheath or a laminate structure typically applied in dynamical cables, e.g. one of an Al/Al-alloy, a Cu/Cu-alloy, a Sn/Sn-alloy, a Ti/Ti-alloy or a Fe/Fe-alloy. For example, a copper alloy such as e.g. CuNi, CuNiSi, CuZn, CuSn, or CuAl, or an iron alloy such as e.g. 316 steel.

The invention is not tied to any specific design of the conductor 21, 121, 41, 141 and may comprise one or more electric conductors where each conductor consists of either a single strand or a plurality of strands arranged in a bundle. In the case of applying an electric conductor comprising a bunt of strands, the space in between the strands of electrically conductive material may be occupied by a semiconducting filler compound. Each electric conductor is typically electrically insulated by a dielectric layer and electrically shielded by a semiconducting layer arranged radially around the conductor 22, 122, 42, 142.

In a further aspect, the first conductor 21, 121 is electrically connected to the second conductor 41, 141 by joining the first conductor 21, 121 and the second conductor 41, 141 directly to each other.

Alternatively, the cable joint 60, 160 comprises a joint conductor 61, 161 for joining the first conductor 21, 121 and the second conductor 41, 141 to each other.

In a further aspect, the first electrically insulating layer 22, 122 comprises an inner semiconductive layer, an outer semiconductive layer and an intermediate insulating layer between the inner semiconductive layer and the outer semiconductive layer, the second electrically insulating layer 42, 142 comprises an inner semiconductive layer, an outer semiconductive layer and an intermediate insulating layer between the inner semiconductive layer and the outer semiconductive layer, and the joint insulation layer 62, 162 comprises an inner semiconductive layer, an outer semiconductive layer and an intermediate insulating layer between the inner semiconductive layer and the outer semiconductive layer.

In further aspect, the first power cable section 20, 120 comprises a first outer sheath 24, 124 radially outside of the first water barrier 23, 123 the second power cable section 40, 140 comprises a second outer sheath 44, 144 radially outside of the second water barrier 43, 143 and the joint 60, 160 comprises a joint over-sheath 64 radially outside of the joint water barrier 63, 163.

In a further aspect where the power cable assembly 1 comprises a joint, the joint water barrier 63, 163 may be shaped as a sleeve.

In a further aspect the power cable assembly 1 may have a joint water barrier 63, 163 that is partially overlapping the first water barrier 23, 123 and/or the second water barrier 43, 143.

In a further aspect the power cable assembly 1 comprising a joint, the joint water barrier 63, 163 may be joined to the first water barrier 23, 123 and to the second water barrier 43, 143 by welding, soldering or by an adhesive.

In a further aspect the power cable assembly 1 may further comprise
  a first reinforcement 138 located radially around and attached to a part of the joint water barrier 163 adjacent to a first attachment 136 at a first end of the joint water barrier 163, the first attachment 136 at the first end of the joint water barrier 163, and further to a part of the first outer sheath 124 of the first power cable section 120 and/or
  a second reinforcement 139 located radially around and attached to a part of the joint water barrier 163 adjacent to a second attachment 137 at the second end of the joint water barrier 163, the second attachment 137 at the second end of the joint water barrier 163 and further to a part of the second outer sheath 144 of the first power cable section 140.

In one embodiment of the first aspect the first reinforcement 138 and the second reinforcement 139 comprise a polyethylene-based adhesive.

In one example embodiment, the polyethylene based adhesive is a linear low-density polyethylene which is commercially available under the trademark Yparex 9403 supplied by The Compound Company in Netherland. In a further example embodiment, the polyethylene based adhesive is polyethylene based copolymers where the comonomer has a polar functionality such as carboxylic acid, ester, anhydride, epoxy, alcohol, thiol, amine, such as e.g. copolymer of ethylene and ethyl acrylate (or similar acrylates containing >5% ethyl acrylate, copolymer of ethylene and ethyl acrylic acid, methacrylic acid or similar, containing >5% ethyl acrylate, copolymer of ethylene and glycidyl methacrylate (or similar epoxy-based monomer such as 1,2-epoxy-1-butene or similar), containing >5% ethyl acrylate, or copolymer of ethylene and maleic-anhydride (grafted or random block-copolymers) with comonomer content >5%. In one example embodiment, the adhesive may be provided in the form of an adhesive tape which is applied helically to form an adhesive layer of approx. 1.5 mm thickness.

In a second aspect there is provided a method for joining a first water barrier layer 23, 123 of a first cable section 20, 120 and a second water barrier layer 43, 143 of a second cable section 40, 140 at a location of a joint 60, 160, wherein the method comprises the steps of:
  a) providing a sleeve-shaped joint water barrier 63, 163 made of tin or a tin alloy;
    moving the sleeve-shaped joint water barrier 63, 163 radially outside, and along, the first cable section 20, 120 and/or the second cable section 40, 140 to the location of the joint 60, 160;
  b) radially compressing the sleeve-shaped joint water barrier 63, 163 at the location of the joint 60, 160;
  c) joining a first end of the joint water barrier 63, 163 to the first water barrier 23, 123 of the first cable section 20, 120 wherein the first end of the joint water barrier 63, 163 is partially overlapping one end of the first water barrier 23, 123;
  d) joining a second end of the joint water barrier 63, 163 to the second water barrier 43, 143 of the second cable section 40, 140 wherein the second end of the joint water barrier 63, 163 is partially overlapping one end of the second water barrier 43, 143.

In one embodiment of the second aspect the step of radially compressing the sleeve-shaped joint water barrier 63, 163 at the location of the joint 60, 160 comprises: rolling, hydrostatic forming or hydraulic forming.

In one embodiment of the second aspect the steps of joining a first end of the joint water barrier 63 to a first water barrier 23 of the first cable section 20 and joining a second end of the joint water barrier 63 to a second water barrier 43 of the second cable section 40 are by welding, soldering or by an adhesive.

In a third aspect there is provided method for joining a first water barrier layer 23, 123 of a first cable section 20, 120 and a second water barrier layer 43, 143 of a second cable section 40, 140 at a location of a joint 60, 160, wherein the method comprises the steps of:
  a) providing a joint water barrier in form of a sheet 63, 163 made of tin or a tin alloy;

folding the joint water barrier (63, 163) sheet having a first side edge (63a) and a second side edge (63b) opposite of the first side edge (63a) radially around the joint (60, 160), thereby providing the first side (63a) and the second side (63b) adjacent to each other;

b) forming a joint water barrier (63, 163) sheath by longitudinally friction stir welding the first side edge (63a) and the second side edge (63b);

c) joining a first end of the joint water barrier 63, 163 to the first water barrier 23, 123 of the first cable section 20, 120;

d) joining a second end of the joint water barrier 63, 163 to the second water barrier 43, 143 of the second cable section 40, 140.

In one embodiment of the third aspect the steps of joining a first end of the joint water barrier 63 to a first water barrier 23 of the first cable section 20 and joining a second end of the joint water barrier 63 to a second water barrier 43 of the second cable section 40 are formed by soldering or orbital friction stir welding.

Making joints for subsea cables is complicated and time consuming. By using friction stir welding to form the joint water barrier as described above the process can be made simpler and faster.

The use of friction stir welding may also reduce the total length of the joints.

Friction stir welding (FSW) is a process where metal pieces are welded by transforming the metal at the site of the weld to a plasticised state by mechanically stirring the materials together under precisely controlled process conditions to form a high-integrity, full penetration welded joint. The friction is obtained by a rotating tool that plunges into the material at the site of the joint.

FSW is particularly useful when joining dissimilar metal pieces with different melting points that are difficult to weld using conventional welding techniques.

In one embodiment of the second- or third aspect
wherein step c) further comprises forming a first reinforcement 138 by
attaching the first end of the first the joint water barrier 163 to the first water barrier 123 by forming a first attachment 136, and
arranging a polyethylene based adhesive layer laid radially around and covering at least a part of the joint water barrier 163 adjacent to the first attachment 136 at the first end of joint water barrier 163, the first attachment 136 at the first end of the joint water barrier 163 and further a part of the outer sheath 124 of the first power cable section 120, and
wherein step d) further comprises forming a second reinforcement 139 by
attaching the second end of the sleeved-shaped joint water barrier 163 to the second water barrier 143 by forming an attachment 137, and
arranging a polyethylene based adhesive layer laid radially around and covering at least a part of the joint water barrier 163 adjacent to the attachment 137 at the second end of the joint water barrier 163, the second attachment 137 at the second end of the joint water barrier 163 and further a part of the outer sheath 144 of the second power cable section 140.

In one embodiment of the second- or third aspect a further thermoplastic layer is laid radially around and covering at least the first reinforcement 138 and the second reinforcement 139 and a heat treating of the polyethylene based adhesive layer of the first reinforcement 138 and the second reinforcement 139 and of the thermoplastic layer is performed at a temperature thermally setting and melting together the adhesive layer and the thermoplastic layer.

Further examples of polyethylene based adhesive layers are described above.

When the adhesive layer is deposited, the next step in the formation of the reinforcing element comprises depositing a layer of a thermoplastic material on top of the adhesive layer. The thermoplastic layer may in one example embodiment be a high density polyethylene applied by extruding it into a tape which is applied helically over the polyethylene based adhesive layer to form an outer sheathing layer of a thickness aligning its outer diameter with the outer diameter of the outer sheathing of the power cable, i.e. make a smooth transition at the interface between the thermoplastic layer and the outer sheathing of the power cable with no or only a relatively small height difference across the interface, which typically gives a thickness of the thermoplastic layer in the range of 1 to 5 mm, or in the range of 2 to 4 mm, or in the range of 3 to 3.5 mm.

Figure 5:
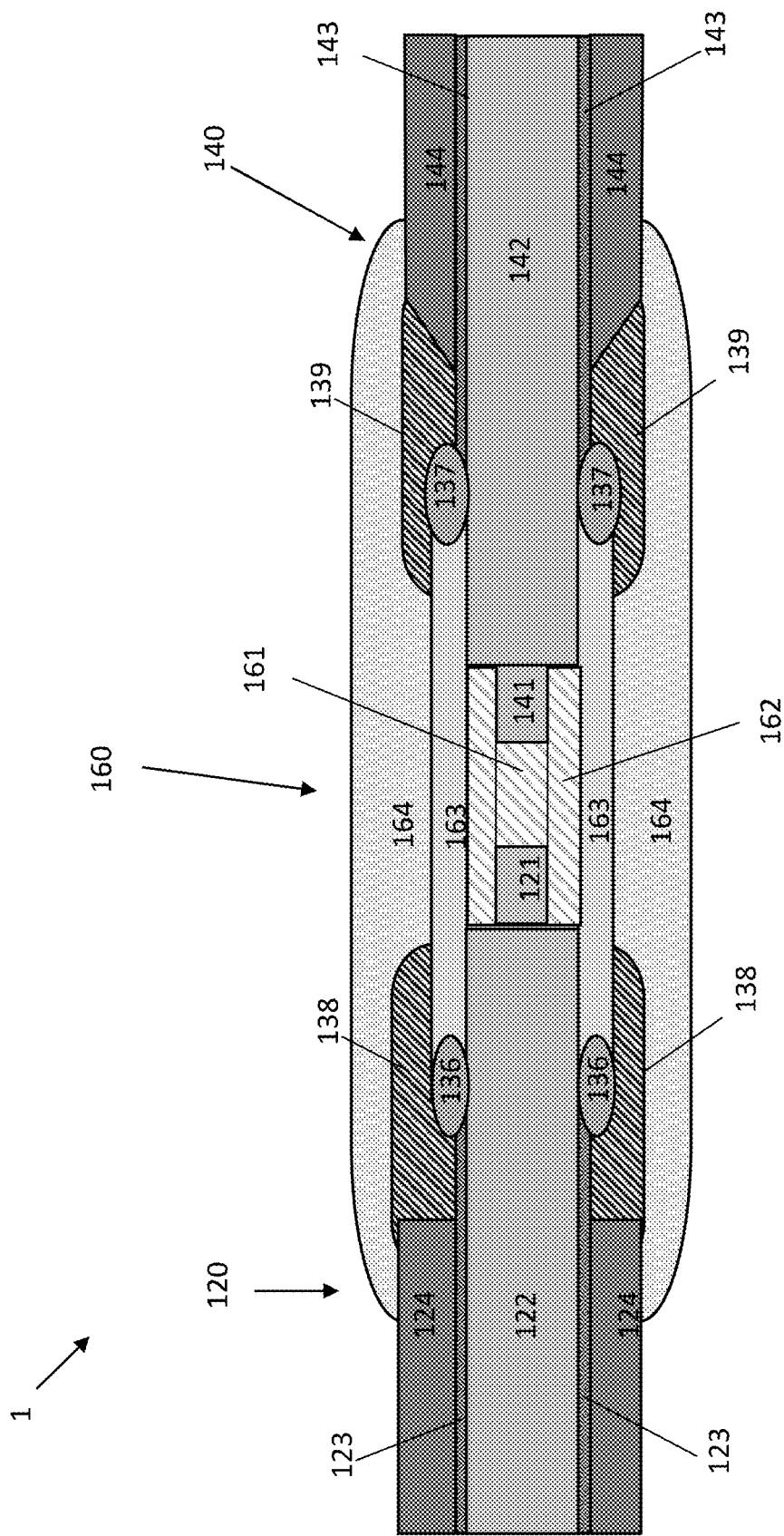
FIG. 5 illustrates a side view of an example embodiment wherein the first cable section and the second cable section have a reinforcing element of both sides of the joint water barrier and with an over-sheath over the joint water barrier.

An example of a typical process of joining power cables and forming the joint water barrier 163 and the reinforcing elements 138, 139 is schematically illustrated as shown in FIG. 5.

In one embodiment of the second- or third aspect the first water barrier 23, 123 of the first cable section 20, 120 and/or the second water barrier 43, 143 of the second cable section 40, 140 is/are a welded metal sheath or a laminate structure comprising a metal foil between two polymeric layers, wherein the metal is selected from either an Al/Al-alloy, a Cu/Cu-alloy, a Sn/Sn-alloy, a Ti/Ti-alloy or a Fe/Fe-alloy, a copper alloy such as CuNi, CuNiSi, CuZn, CuSn, CuAl, or a Fe-alloy such as 316 steel.

Further details of the water barrier material that is also applicable as water barrier material for the first cable section 20 and the second cable section 40 are described above under section "water barrier layer for cable joints made of tin or a tin alloy".

The power cable may in one example embodiment further include an over-sheath 64, 164 laid radially and enveloping the joint water barrier 63, 163, such as shown schematically in FIG. 2 and FIG. 5. Suitable materials for the over-sheath in form of a mantel are well known to the skilled person such as e.g. a shrinkage hose made of a thermosetting polymer, a polyethylene polymer such as e.g. chlorosulphanated polyethylene (CSP), etc.

In a fourth aspect, there is provided a joint water barrier 63, 163 for forming a water barrier of a joint 60, 160 joining a first cable section 20, 120 and a second cable section 40, 140 wherein the joint water barrier 63, 163 is sleeve-shaped and wherein the joint water barrier 63, 163 is made of a commercially pure Sn material or is made of Sn alloy material.

Having generally described this invention, a further understanding can be obtained by reference to the examples. The examples illustrate the properties and effects of certain aspects of the invention, and are provided herein for purposes of illustration only, and are not intended to be limiting.

EXAMPLES

Example 1

Simulated production and bending tests of cable joints wherein the joint is made of either SnSb5 alloy or SnCu0.7 alloy and joint connected to metal tube by swagging.

Production processes for jointing of cables, in particular cables of dissimilar metals is challenging because deformation during bending of the power cable with joint may not be homogeneous.

Simulated production process conditions and bending tests of a simulated joint wherein the joint is made of either a SnSb5- or SnCu0.7 alloy shows good results with little or no unfavourable local deformation after bending.

Example 2—Tests Related to Formation of Tin Pest

Power cables may be subject to harsh environment such as drop in temperatures below 0° C. It is well known that tin may form tin pest at low temperatures in particular temperatures below −30 to −40° C.

In order to investigate the formation of tin pest. Metal sheet samples made of SnSb5 (95% Sn and 5% Sb) or SnCu0.7 (99.3% Sn and 0.7% Cu) alloys have been stored at −29° C. for approximately 8 months.

The tests show promising results and demonstrates that the formation of tin pest after 8 months storage at −29° C. is low and in accordance with earlier published results disclosed in for example Cornelius, B. et al, "The phenomenon of tin pest: A review", Microelectronics Reliability 2017, vol. 79, page 175-192 and Plumbridge, WJ, "Tin pest issues in lead-free electronic solders", Journal of material Science: materials in Electronics, 2007, vol. 18, p. 307-318. Results from experiments disclosed in these articles show that formation of tin pest on pure Sn (99.998%) resemble the formation of tin pest on SnSb5, i.e. there is little difference between the formation of tin pest on pure tin compared to SnSb5 and SnCu0.7.

Example 3—Friction Stir Welding (FSW) of Sn-Alloy Sheet Samples

Friction stir welding of two metal sheet samples wherein the two metal sheet samples where either made of SnSb5 or SnCu0.7 have been conducted using the following parameters for the rotating tool: RPM: 1500, Speed: 80, Needle depth: 2,3 and Angle: 2 degrees.

Using the above-mentioned parameters, the two Sn-alloy sheet samples were successfully welded.

LIST OF REFERENCE SIGNS 1 power cable assembly
20 first power cable section
21 first conductor
22 first electrically insulating layer
23 first water barrier
24 first outer sheathing
40 second power cable section
41 second conductor
42 second electrically insulating layer
43 second water barrier
44 second outer sheathing
60 cable joint
61 joint conductor
62 joint insulating layer
63 joint water barrier
(63a) first side edge of a joint water barrier sheet
(63b) second side edge of a joint water barrier sheet
64 over sheath
120 first power cable section
121 first conductor
122 first electrically insulating layer
123 first water barrier
124 first outer sheath
140 second power cable section
141 second conductor
142 second electrically insulating layer
143 second water barrier
144 second outer sheath
136 first attachment
137 second attachment
138 first reinforcement
139 second reinforcement
160 cable joint
161 joint conductor
162 joint insulating layer
163 joint water barrier
164 over-sheath

The invention claimed is:

1. A power cable assembly comprising:
a first power cable section having a first conductor, a first electrically insulating layer outside the first conductor and a first water barrier provided radially outside the first electrically insulating layer;
a second power cable section having a second conductor, a second electrically insulating layer outside of the second conductor and a second water barrier provided radially outside the second electrically insulating layer;
a cable joint at which location the first conductor is electrically connected to the second conductor,
wherein the cable joint comprises a joint insulating layer for joining the first electrically insulating layer and the second electrically insulating layer and a joint water barrier for joining the first water barrier and the second water barrier;
wherein the joint water barrier is made of tin or a tin alloy;
wherein the joint water barrier is joined to the first water barrier and to the second water barrier by welding, soldering or by an adhesive, thereby forming a first attachment between the first water barrier and the joint water barrier and forming a second attachment between the second water barrier and the joint water barrier;
wherein the power cable assembly further comprises:
a first reinforcement located radially around and attached to a part of the joint water barrier adjacent to a first attachment at a first end of the joint water barrier, to the first attachment at the first end of the joint water barrier, and further to a part of the first outer sheath of the first power cable section and/or
a second reinforcement located radially around and attached to a part of the joint water barrier adjacent to a second attachment at the second end of the joint water barrier, the second attachment at the second end of the joint water barrier and further to a part of the second outer sheath of the first power cable section.

2. The power cable assembly according to claim 1, wherein the first water barrier and/or the second water barrier is/are a welded metal sheath or an extruded metal sheath or a laminate structure comprising a metal foil between two polymeric layers and wherein the metal is selected from either an Al/Al-alloy, a Cu/Cu-alloy, a Sn/Sn-alloy, a Ti/Ti-alloy or a Fe/Fe-alloy, a copper alloy such as CuNi, CuNiSi, CuZn, CuSn, CuAl, or a Fe-alloy such as 316 steel.

3. The power cable assembly according to claim 1, wherein the joint water barrier is made of commercially pure Sn, Sn—Cu or Sn—Sb.

4. The power cable assembly according to claim 1, wherein the joint water barrier, is made of:

commercially pure Sn material that has a Sn content of at least 99.5% by weight and a content of unavoidable impurities from 0 to 0.5% by weight based on the total weight of the pure Sn material, and wherein the content of Sn and unavoidable impurities sum up to 100% by weight;

a Sn alloy that has a Sn content from 97% 99.5% by weight, a Cu content from 0.5% to 2% by weight and a content of unavoidable impurities of 0 to 1% by weight based on the total weight of the Sn alloy, and wherein the content of Sn, Cu and unavoidable impurities sum up to 100% by weight; or a Sn alloy that has a Sn content from 93% 96% by weight, a Sb content from 4% to 6% by weight and a content of unavoidable impurities of 0 to 1% by weight based on the total weight of the Sn alloy, and wherein the content of Sn, Cu and unavoidable impurities sum up to 100% by weight.

5. The power cable assembly according to claim 1, wherein the joint water barrier is partially overlapping the first water barrier and/or the second water barrier.

6. The power cable assembly according to claim 1, wherein the first reinforcement and the second reinforcement comprise a polyethylene-based adhesive.

7. The power cable assembly according to claim 1, wherein the joint water barrier is shaped as a sleeve.

8. A method for joining the first water barrier layer of the first cable section and the second water barrier layer of the second cable section at a location of a said cable joint, wherein the method comprises the steps of:
   a) providing a sleeve shaped said joint water barrier made of tin or a tin alloy as claimed in claim 1, said joint water barrier being sleeve-shaped;
   b) moving the sleeve-shaped joint water barrier radially outside of, and along, the first cable section and/or the second cable section to the location of the joint;
   c) radially compressing the sleeve-shaped joint water barrier at the location of the joint;
   d) joining a first end of the joint water barrier to the first water barrier of the first cable section wherein the first end of the joint water barrier is partially overlapping the first water barrier;
   e) joining a second end of the joint water barrier to the second water barrier of the second cable section wherein the second end of the joint water barrier is partially overlapping the second water barrier.

9. The method according to claim 8, wherein the step of radially compressing the sleeve-shaped joint water barrier at the location of the joint comprises: rolling, hydrostatic forming or hydraulic forming.

10. The method according to claim 8, wherein the steps of joining a first end of the joint water barrier to a first water barrier of the first cable section and joining a second end of the joint water barrier to a second water barrier of the second cable section are by welding, soldering or by an adhesive.

11. A method for joining the first water barrier layer of the first cable section and the second water barrier layer of the second cable section at a location of a said cable joint, wherein the method comprises the steps of:
   a) providing said joint water barrier in form of a sheet made of tin or a tin alloy as claimed in claim 1;
   b) folding the joint water barrier sheet having a first side edge and a second side edge radially around the joint, thereby providing the first side and the second side adjacent to each other;
   c) forming a joint water barrier sheath by longitudinally friction stir welding the first side edge and the second side edge;
   d) joining a first end of the joint water barrier to the first water barrier of the first cable section;
   e) joining a second end of the joint water barrier to the second water barrier of the second cable section.

12. The method according to claim 11, wherein the steps of joining a first end of the joint water barrier to a first water barrier of the first cable section and joining a second end of the joint water barrier to a second water barrier of the second cable section are performed by soldering or orbital friction stir welding.

13. The method according to claim 8, wherein step d) further comprises
   forming a first reinforcement by attaching the first end of the joint water barrier to the first water barrier by forming a first attachment, and
   arranging a polyethylene based adhesive layer laid radially around and covering at least a part of the joint water barrier adjacent to the first attachment, the first attachment and further a part of an outer sheath of the first power cable section, and
   wherein step d) further comprises forming a second reinforcement by
   attaching the second end of the joint water barrier to the second water barrier by forming a second attachment, and
   arranging a polyethylene based adhesive layer laid radially around and covering at least a part of the joint water barrier adjacent to the second attachment, the second attachment and further a part of an outer sheath of the second power cable section.

14. The method according to claim 13, wherein a further thermoplastic layer is laid radially around and covering at least the first reinforcement and the second reinforcement and a heat treating of the polyethylene based adhesive layer of the first reinforcement and the second reinforcement and of the thermoplastic layer is performed at a temperature thermally setting and melting together the adhesive layer and the thermoplastic layer.

15. The method according to claim 8, wherein the first water barrier of the first cable section and/or the second water barrier of the second cable section is/are a welded metal sheath, an extruded metal sheath or a laminate structure comprising a metal foil between two polymeric layers and wherein the metal is selected from either an Al/Al-alloy, a Cu/Cu-alloy, a Sn/Sn-alloy, a Ti/Ti-alloy or a Fe/Fe-alloy, a copper alloy such as CuNi, CuNiSi, CuZn, CuSn, CuAl, or a Fe-alloy such as 316 steel.

16. A power cable assembly comprising:
   a first power cable section having a first conductor, a first electrically insulating layer outside the first conductor and a first water barrier provided radially outside the first electrically insulating layer;
   a second power cable section having a second conductor, a second electrically insulating layer outside of the second conductor and a second water barrier provided radially outside the second electrically insulating layer;
   a cable joint at which location the first conductor is electrically connected to the second conductor,
   wherein the cable joint comprises a joint insulating layer for joining the first electrically insulating layer and the second electrically insulating layer and a joint water barrier for joining the first water barrier and the second water barrier;
   wherein the joint water barrier is made of tin or a tin alloy, wherein the joint water barrier is joined to the first water barrier and to the second water barrier by welding, soldering or by an adhesive, thereby forming a first attachment between the first water barrier and the joint water barrier and forming a second attachment between the second water barrier and the joint water barrier, wherein power cable assembly further comprises a first reinforcement located radially around and attached to at least a part of the joint water barrier adjacent to the first attachment, the first attachment, and further to a part of a first outer sheath of the first power cable section and/or a second reinforcement located radially around and attached to at least a part of the joint water barrier adjacent to the second attachment, the second attachment and further to a part of a second outer sheath of the second power cable section, and wherein the first reinforcement and the second reinforcement comprise a polyethylene-based adhesive.

17. A power cable assembly comprising:

a first power cable section having a first conductor, a first electrically insulating layer outside the first conductor and a first water barrier provided radially outside the first electrically insulating layer;

a second power cable section having a second conductor, a second electrically insulating layer outside of the second conductor and a second water barrier provided radially outside the second electrically insulating layer;

a cable joint at which location the first conductor is electrically connected to the second conductor, wherein the cable joint comprises a joint insulating layer for joining the first electrically insulating layer and the second electrically insulating layer and a joint water barrier for joining the first water barrier and the second water barrier;

wherein the joint water barrier is made of tin.

* * * * *